J. CLAYTON.
Gang-Plow.
No. 213,623. Patented Mar. 25, 1879.
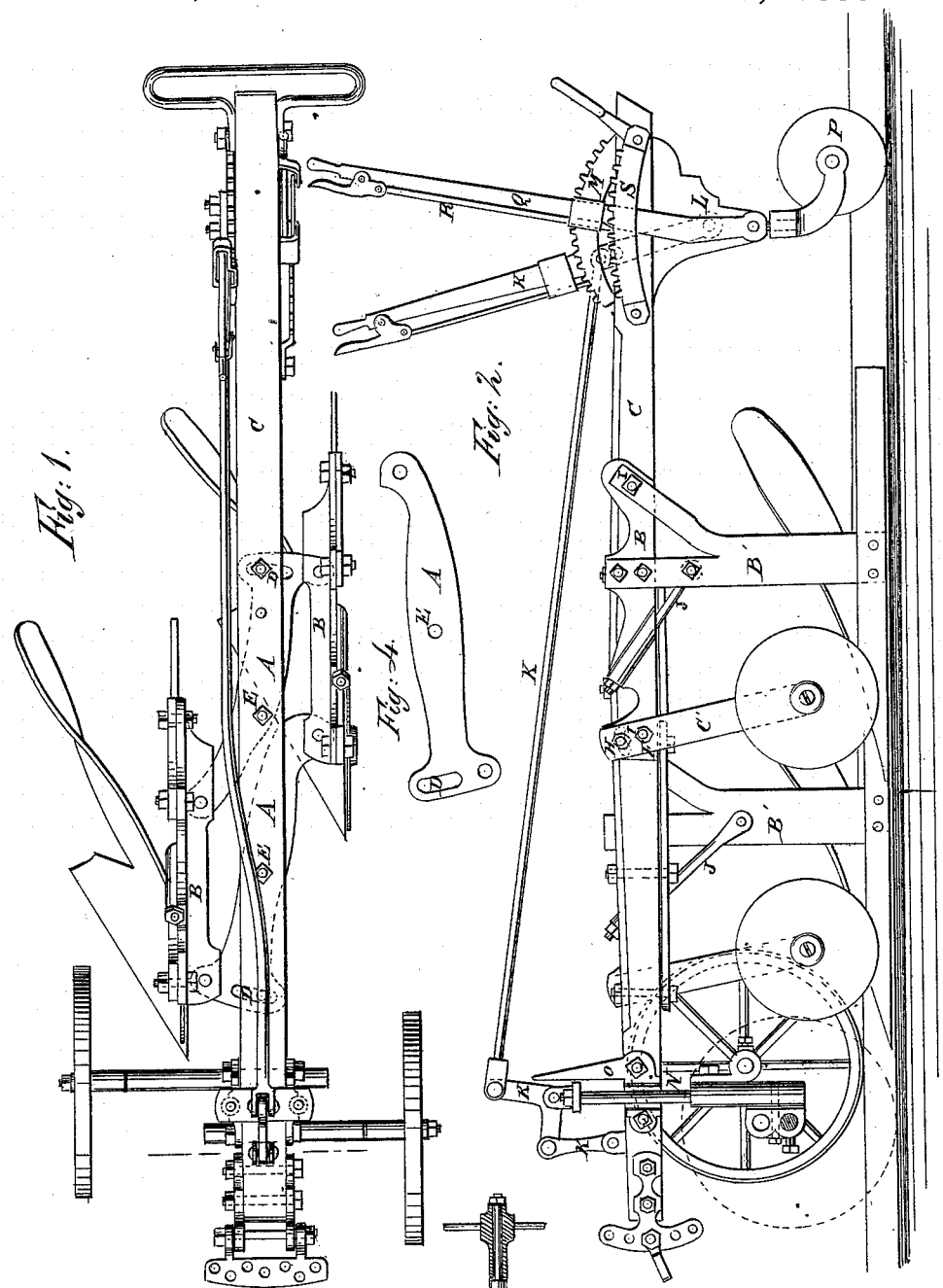

UNITED STATES PATENT OFFICE.

JOHN CLAYTON, OF THE GRANGE FARM, CLAYTON, (BRAINERD, P. O.,) MINNESOTA.

IMPROVEMENT IN GANG-PLOWS.

Specification forming part of Letters Patent No. 213,623, dated March 25, 1879; application filed December 10, 1878.

*To all whom it may concern:*

Be it known that I, JOHN CLAYTON, of the Grange Farm, Clayton, Cass county, (Brainerd P. O.,) Minnesota, have invented a new and useful Improvement in Adjustable Gang-Plows, of which the following is a specification:

Figure 1 is a top view of my improved gang-plow. Fig. 2 is a side view of the same. Fig. 3 is a detail sectional view of the same, taken through the line $x$ $x$, Fig. 1. Fig. 4 is a detail view of one of the pivoted arms.

Similar letters of reference indicate corresponding parts.

The object of this invention is to regulate the width of the cut or furrow in plowing, so as to suit the power of the team in use and the character of the soil to be broken or plowed by a parallel adjustment of the shares or plows, and also to regulate the depth of the cut or furrow by a lever attachment for lifting the plows out of the ground.

A A are the extending arms, secured to the main or wood beam C, and pivoting on bolts E E. The flanged side beams B B are fastened to either the upper or under surface of the ends of the arms A A by bolts. To these side beams are attached the posts B' B', which carry the plowshares and the shanks or hangers C' C' of the rolling colters.

The degree of extension of the arms A A, and the consequent limits of horizontal adjustability of the plowshares, are determined by the length of the slots D D.

To secure the arms in any desired position the nuts on the bolts which engage in these slots are set tightly down.

The hangers carrying the colters are pivoted to the side beams by bolts F F, and can be adjusted and secured laterally by means of the slots H H in the side beams and the engaging-bolts I I.

A lever and connecting-rod attachment, K, pivoted at L, and adaptable by means of the quadrant and ratchet M, regulates the depth of furrow as the plow travels by lifting or lowering the rods N N.

The side brackets O O, with upward prolongations on the clevis end of the beam C, are for the purpose of preventing the rods from being pulled out of upright position by the action of the lever, and the grooves or guides in them also contribute to this end.

The caster-wheel P may be raised or lowered by the lever Q, which is held in position by engaging the pawl R in the ratchet S, and serves to lift the heel of the plow above the level of the ground, so that the plowman can run it round on this wheel in line with the next furrow. The same principle may be applied to single-furrow or two or three furrow plows.

In case of the single-furrow plow, the side beam may be bolted to the wood or main beam, with the necessary holes, slots, bolts, &c., for the same adjustment of plow-colter, &c., but without extending arms.

In the case of a three-furrow plow, the front and rear plows may have extending arms with side beams, as in the case of the two-furrow plow, and the middle or center plow may be a fixture to the main or wood beam.

In the case of the colters, standing colters, rolling colters, or caster rolling colters may be used with good effect in each case.

The plows may be used as gang-breakers or as old ground-plows by changing the shares.

The merits of this invention lie in the extreme lightness of draft induced by the wheel attachments, in the possibility of raising or lowering the plows at will by the action of the levers, and in the ease with which the plowman can run the plow round on the caster-wheel to line with his team and the next furrow.

Having thus fully described my invention, I claim as new and desire to secure by Letters Patent—

1. The arms A A, provided with the slots D, and pivoted at their centers and through the said slots to the under side of the beam, and at the ends to the side beams B B, substantially as herein shown and described, and for the purpose described.

2. The flanged side beams B B, attached to the ends of the arms A A, and provided with slots, by means of which, and bolts and screws, the hangers C' C' and the posts B' B' may be adjusted and secured at any desired inclination, substantially as herein shown and described.

3. The side brackets, substantially as shown and described, on the clevis end of the beam, for preventing the rods from being pulled out of upright position by the action of the lever.

JOHN CLAYTON.

Witnesses:
T. C. FERNOLD,
W. S. BATES.